DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 7, 1972

896 O.G. 17

T896,009

HIGH FRICTION ARTICLE BASED ON A POLYIMIDE RESIN

Frank Clyde Starr, Jr., Wilmington, Del., assignor to E. I. du Pont de Nemours and Company, Wilmington, Del.

Continuation of application Ser. No. 711,487, Mar. 8, 1968, which is a continuation-in-part of abandoned application Ser. No. 415,458, Dec. 2, 1964. This application Oct. 19, 1970, Ser. No. 82,118

Int. Cl. C08g *51/10, 51/12*

U.S. Cl. 260—37 N

No Drawing. 18 Pages Specification

A molded article especially adapted for use as high-friction articles such as brake linings, is provided wherein the molded article is characterized by a co-efficient of friction of from 0.4 to 0.8 and a wear constant of at least 50, and consists of between about 20% and about 60% by weight of a linear aromatic polyimide resin, from between about 15% and about 50% by weight of a fibrous filler such as asbestos fibers, from between about 5% and about 20% of a metal such as copper in elongated form, from between about 2% and about 10% of an abrasive filler such as aluminum oxide in a silicon-containing dispersion wherein said abarsive is characterized by a hardness of at least about 8 on the Moh scale, and up to about 25% by weight of a siliceous glass.